May 18, 1954. D. RATZLAFF ET AL 2,678,489
WORK STATION UNIT FOR PROGRESSIVE ASSEMBLY LINES
Filed April 12, 1951 3 Sheets-Sheet 1
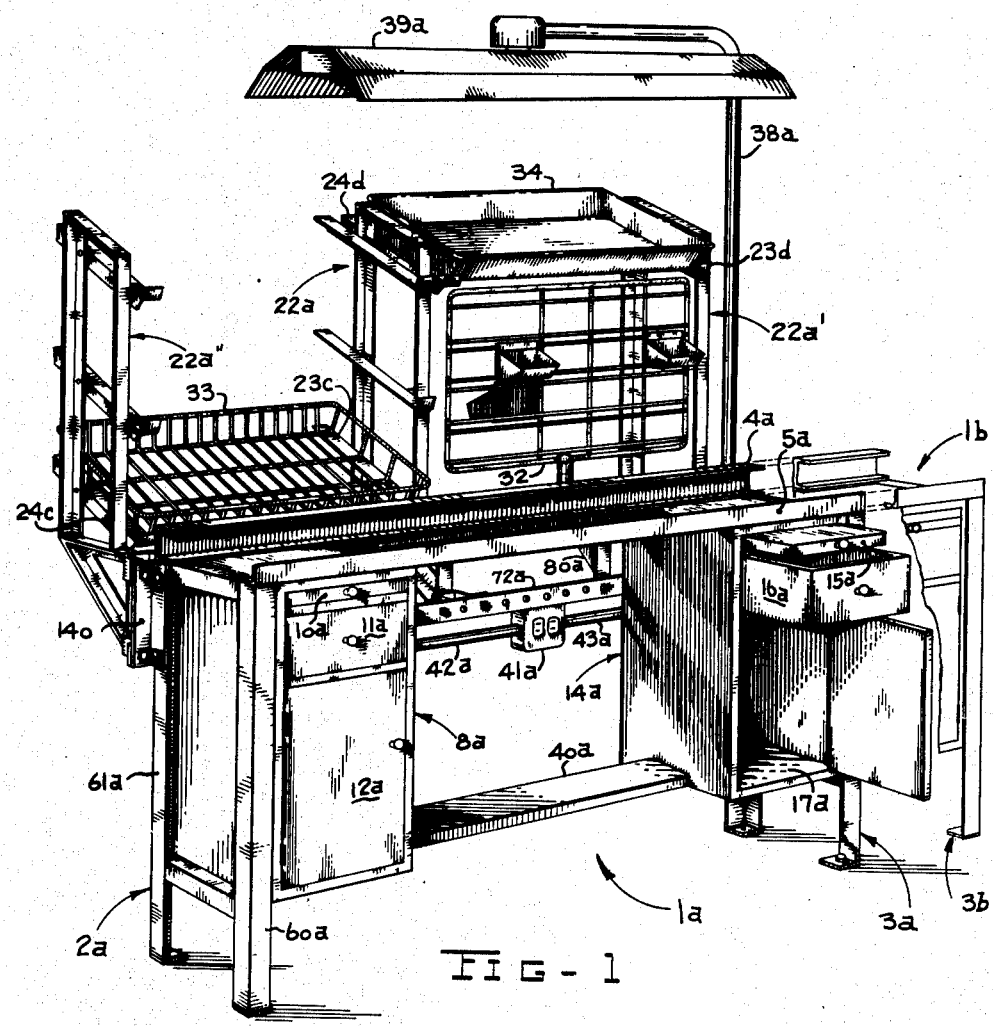
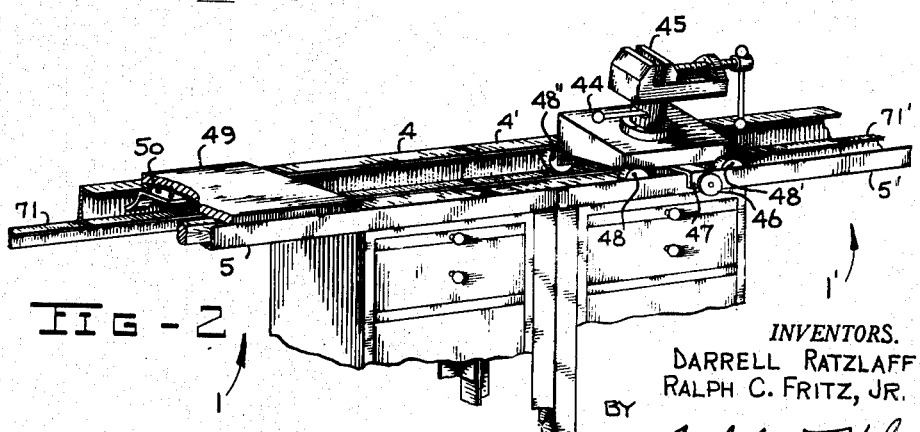
INVENTORS.
DARRELL RATZLAFF
RALPH C. FRITZ, JR.

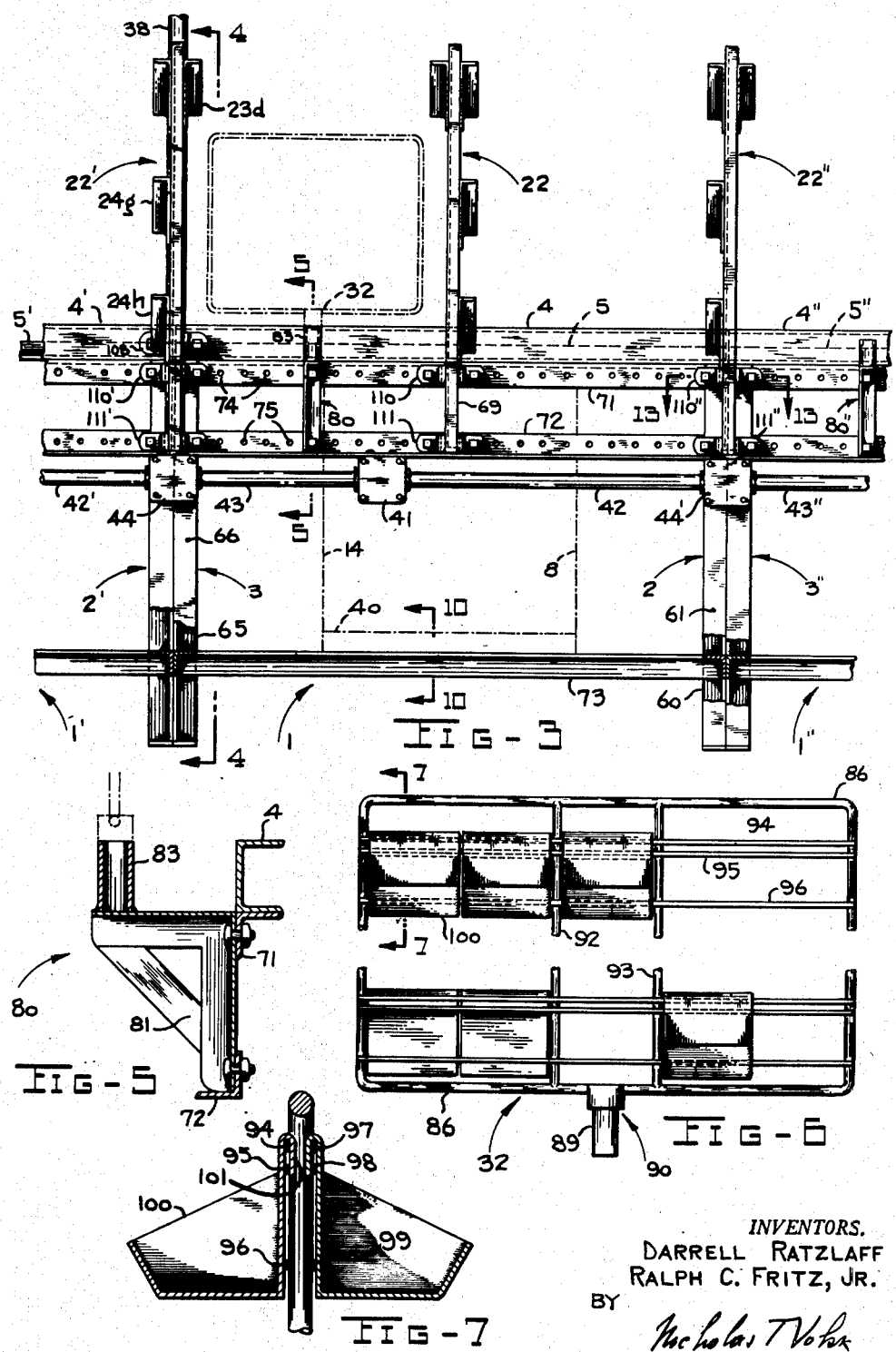

May 18, 1954     D. RATZLAFF ET AL     2,678,489
WORK STATION UNIT FOR PROGRESSIVE ASSEMBLY LINES
Filed April 12, 1951     3 Sheets-Sheet 3
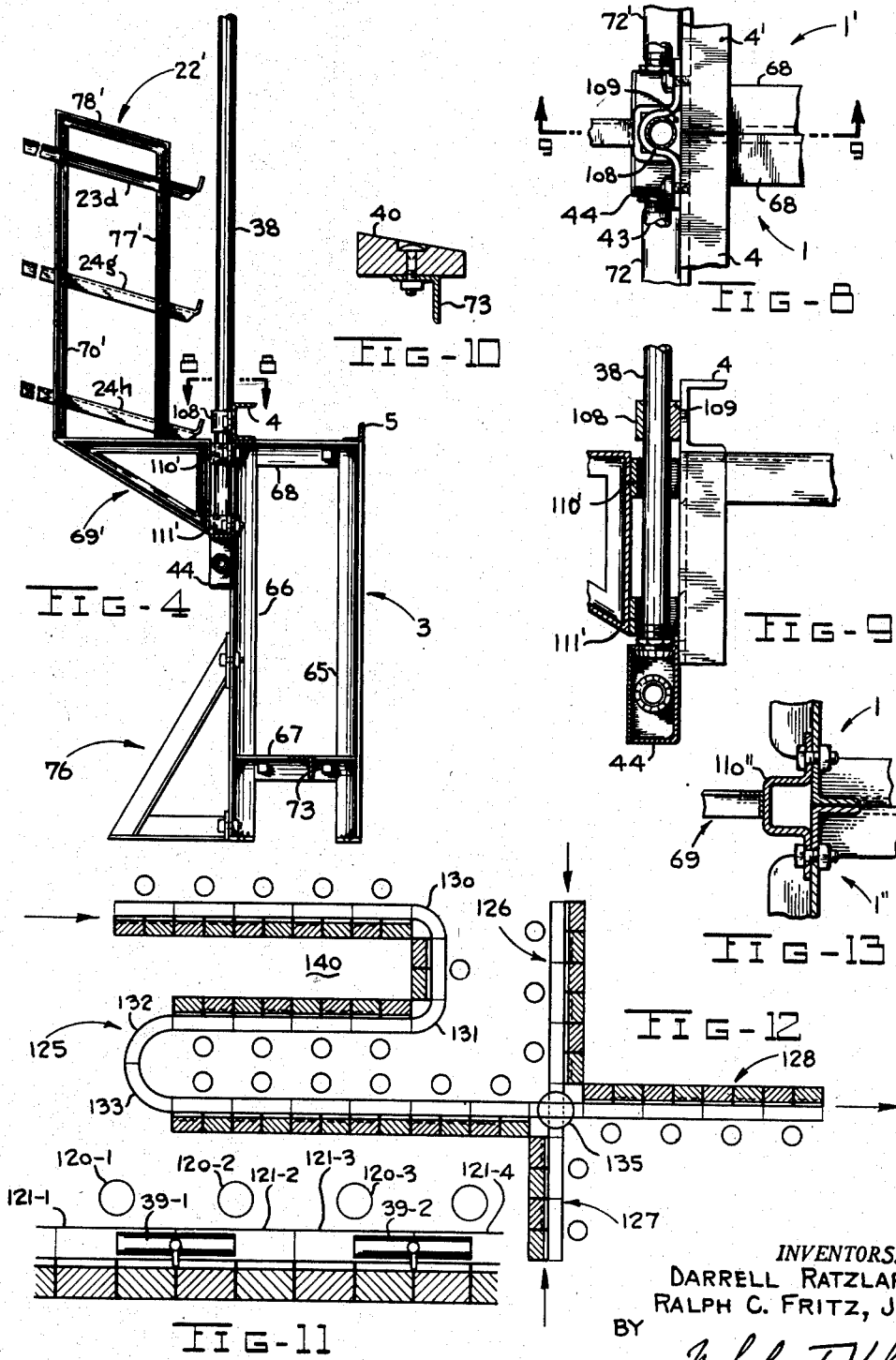
INVENTORS.
DARRELL RATZLAFF.
RALPH C. FRITZ, JR.
BY Patented May 18, 1954

2,678,489

UNITED STATES PATENT OFFICE 2,678,489

WORK STATION UNIT FOR PROGRESSIVE ASSEMBLY LINES

Darrell Ratzlaff, Los Angeles, and Ralph C. Fritz, Jr., Van Nuys, Calif., assignors to Hughes Tool Company, Houston, Tex., a corporation of Delaware Application April 12, 1951, Serial No. 220,612

6 Claims. (Cl. 29—200)

This invention relates to a work station comprising a unitized work area associated with parts storage facilities having a high degree of adjustability. In particular, this invention relates to such a work station which is characterized by its adaptability to single unit construction which provides an individual work station, or to a multiple unit construction which provides several work stations; and more particularly, to such a work station having characteristics which permit the joining of single unit structures and multiple unit structures in any desired combination to form a multi-stage progressive assembly line.

The primary purpose of utilizing an assembly line is to enable a manufactured article to be assembled with maximum efficiency at a minimum cost of assembly per unit, and also to produce a maximum number of units in a given period of time. The efficiency of an assembly line is determined by several factors, and considerable trial and error is involved in effecting any efficiency increase of an existing production line. The established technique in raising the efficiency involves instituting two major types of variation of the established line.

In the first instance, lines of flow of both assembly and sub-assembly lines may be varied so as to enable the various parts to be assembled in different sequences. Also, the intersection of various sub-assembly and final assembly lines may be revised so as to enable new lines of flow to constitute the final assembly. In this particular type of revision, efficiency is raised by a reorganization of the assembly flow so as to allow quicker and easier junction of the various component parts. Variation of the lines of flow involves a basic physical change in the number and placement of the work stations constituting the original line. The ease with which this reorganization of work stations may be effected dictates, to a large degree, to what extent the lines are, in actual practice, changed. If the difficulty is great, the revision might be abandoned, since any resultant increased efficiency of the line would be bought by the cost of the rearrangement. The difficulty and the attendant high cost encountered in the rearrangement of a production line having a high degree of inflexibility more than offsets any advantage gained in increased production efficiency. The measure of the overall efficiency of a production line must, therefore, include not only the efficiency of the production, but also some indication of the production line's flexibility to revision.

The second factor to be considered in increasing the efficiency of a production line is that of increasing the efficiency of the particular operation performed at each work station. Such an efficiency increase may necessarily require changes in the particular assembly operation performed. If such is the case, then the actual physical structure of the work station must be changed so as to accommodate the new operation. The adaptability of each work station to such internal changes is a prerequisite for quick and inexpensive production changes as may be found necessary for the work operation performed thereon. Thus, the flexibility of an individual work station also imposes a limitation on the flexibility of the overall production line.

Other reasons exist for changing the external arrangement of various work stations and the internal arrangement of the individual stations of an assembly line other than effecting an increase of efficiency. If any increase or decrease in the number of items produced is desired, then a revision of the number of work stations is necessitated and the work performed by each must be changed in proportion to the new production schedule. Assembly line revisions might also be necessitated by new or improved versions of the manufactured articles being assembled thereon. These types of assembly line revisions are similar to those employed in increasing the efficiency thereof.

The internal and external changes of work stations to meet different demands of production or increased efficiency might be extremely difficult and expensive unless considerable care is devoted to the initial design of the line. A production line composed of individual work stations which themselves are flexible both as to the type and amount of assembly work capable of being performed thereon, and which are also flexible in their association with other work stations to form a production line entity, would be eminently susceptible to any overall production line changes deemed necessary.

The invention contemplates providing such an assembly line by providing individual work stations of an extremely flexible nature. The work station contemplated by this invention lends itself to ready internal rearrangement in order that different types of assembly operations may be accommodated as desired. Such internal flexibility allows the type of assembly operation performed to be quickly and easily changed with a minimum amount of time and expense. The particular changes contemplated might be, e. g., changes in the size of parts to be assembled, the number of parts to be assembled, or the speed at which parts are to be assembled.

The individual work station design permits it to be constructed as a separate single unit or as a portion of a multiple unit containing several integral work stations. Both individual work stations and multiple units, may be joined together in various orders to form an assembly line. The resultant production line may be rapidly expanded or contracted by the addition or subtraction of units, respectively, and the association of various units may be varied with respect to each other to alter the lines of flow of the assembly line.

The work station contemplated by this invention may be utilized by itself when not in combination with other work stations, and, as such, would constitute an efficient work bench or sub-assembly station for fabricating parts. The work station design is such as to provide sufficient work space as well as allowing tools, apparatus, and parts to be readily accessible to the worker, and provides, by itself, all the advantages with respect to ease of internal change that are possessed by similar work stations combined to form an assembly line as previously indicated.

The internal adaptability of the work station contemplated by this invention is achieved by providing a partitioned space for storing various parts incident to the assembly operations performed thereon. This partitioned space serves to retain various types of parts within its partitions, and the partitions thereof may be readily manipulated so that different sized volumetric spaces may be formed to accommodate storage of various and different sized parts. This flexibility of the partitioned storage space serves to allow assembly changes to be incorporated at the work station with a minimum of time and trouble.

The work stations of this invention, whether constructed singularly or in multiple, contain a unitized framework of simple, yet sturdy design. A pair of longitudinal members constituting a portion of the framework simultaneously serve two distinct and important functions by, first of all, forming a conveyor track for the lines of flow of the assembly line, and secondly, forming a boundary of the work area of the individual work station. This simultaneous nature of the functions performed adds greatly to the simplicity of both the individual work stations, as well as complete assembly lines formed thereof.

The principal object of this invention is to provide a work station constructed as an individual unit or as a portion of multiple integral work station unit in which both types of units may be joined to form an assembly line suitable for assembly of intricate articles of manufacture or for individual use as a sub-assembly station for fabricating parts; the work station thus provided being extremely adaptable with respect to its internal arrangement whereby new assembly operations may be accommodated, and the units thus provided being extremely adaptable in their junction with other units to obtain extreme flexibility for the lines of flow of the resulting assembly line.

Another object of this invention is to provide an individual work station which contains a flexibly partitioned storage space, and which is suitable for use as an assembly or sub-assembly station for articles of manufacture wherein the operation performed thereon may be readily changed to accommodate the assembling of sub-assemblies of new or different articles of manufacture by revising the partitions of the storage space.

Another object of this invention is to provide a work station suitable for use as an assembly or sub-assembly station for articles of manufacture which station contains a storage space partitioned into various sections, each section providing a storage space for a particular item used in assembly or sub-assembly operations performed at the work station, the partitions of the storage space being capable of ready revision whereby the type and sizes of the items contained in the storage space may be varied by changing the partitions of the storage space as dictated by assembly or sub-assembly operation changes.

Still another object of this invention is to provide a work station suitable for use as an assembly or sub-assembly station for articles of manufacture, and having a work area and a storage space in which the storage space is partitioned to hold various parts used in the assembly operation.

Another object of this invention is to provide an assembly line, composed of a plurality of associated, identical work stations, whose lines of flow may be varied by changing the association of the work stations.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Fig. 1 is a perspective view of a work station constituting this invention;

Fig. 2 is a perspective view showing portions of two work stations joined together;

Fig. 3 is a rear view, partly in cross-section, showing a work station of this invention joined to two similar work stations;

Fig. 4 is a cross-sectional view taken along lines 4—4 of Fig. 3, with a stabilizing brace added;

Fig. 5 is a cross-sectional view taken along lines 5—5 of Fig. 3;

Fig. 6 is a perspective view of a portion of a revolvable tray support constituting a portion of this invention;

Fig. 7 is a cross-sectional view taken along lines 7—7 of Fig. 6;

Fig. 8 is a cross-sectional view taken along lines 8—8 of Fig. 4;

Fig. 9 is a cross-sectional view taken along lines 9—9 of Fig. 8;

Fig. 10 is a cross-sectional view taken along lines 10—10 of Fig. 3;

Figs. 11 and 12 are schematic representations of a portion of an assembly line composed of work stations of this invention; and Fig. 13 is a cross-sectional view taken along lines 13—13 of Fig. 9.

Fig. 1 discloses a perspective view of a work station 1a constructed in accordance with this invention. Work station 1a contains an integral framework consisting, in part, of legs 2a and 3a integral with and interconnected by channel rail 4a and angle rail 5a. Legs 2a and 3a are more fully described in connection with Fig. 4, and additional longitudinal elements which integrally connect legs 2a and 3a, and constitute the remaining portion of the framework, will be more fully illustrated and described in connection with Fig. 3. A cabinet structure 8a is mounted to the framework adjacent leg 2a and contains a slide board 10a, a drawer 11a, and a closet 12a. An identical cabinet 14a, having a slide board 15a, a drawer 16a, and a closet 17a, is mounted adjacent leg 3a of the unitized frame, and these cabinets serve as a storage space for tools, clothing, equipment, etc.

The area bounded by rails 4a and 5a and spreaders 6B of legs 2a and 3a constitute a work area on which work operations may be performed by the operator. An associated storage space for retaining and storing parts needed in the assembly operations performed at the station is formed by the spaces enclosed between slide supports 22a, 22a', and 22a" anchored to the framework of the work station in a manner more fully described in connection with Figs. 4 and 9.

The storage space is further partitioned by various slide rails which are secured to the slide supports in a manner described in connection with Figs. 3 and 4. A tote basket 33 is illustrated by way of example as resting on slide rails 23c and 24c secured to slide supports 22a and 22a", respectively, and a tote pan 34 is also illustrated as resting on slide rails 24d and 23d secured to slide supports 22a and 22a', respectively. Tote baskets and pans may be utilized, as examples, for storing small sub-assembly units as used in the assembly operations. A revolvable tray support 32 supporting various trays is also illustrated as comprising a portion of this storage space mounted to the rear of the framework, and is utilized as a volume storage for parts such as nuts, bolts, etc. It will be more fully described in connection with Figs. 5, 6 and 7.

A lamp 39a, providing illumination for the work station is mounted to lamp standard 38a. Lamp standard 38a is mounted to the framework of the work station in a manner described in connection with Figs. 8 and 9.

An electrical outlet box 41a providing electrical power to the work station is mounted between electrical conduits 42a and 43a each containing electrical conductors. If several work stations are used to form an assembly line, the power may be supplied box 41a from the conductors in either conduit 42a or 43a, the conductors in the other conduit serving to conduct power serially to the remaining work stations. A foot rest 40a extends between the two cabinet sections, the mounting details of which are more fully shown and described in connection with Fig. 10.

As has been previously stated, the work stations of this invention may be constructed as an individual work station or may be constructed integrally with other similar work stations to constitute a multiple work station unit. In both instances, the individual work stations are identical as to their storage space and work area and it is only the form of the framework construction that varies, and then only slightly. Thus, in Fig. 1, there is illustrated a representative work station 1a, disclosed in detail, which forms one work station section of a plurality of integrally formed work stations constituting a single work station unit. This integral construction is illustrated in a schematic manner by the continuation of channel rail 4, angle rail 5, and the addition of legs 3b to the ends thereof which indicate the legs of a final work station 1b of the integral unit. Several work stations may be located between work stations 1a and 1b, all of which are identical to work station 1a and integral with the framework thereof by reason of the longitudinally extending rails 4 and 5. Other longitudinal members of the framework, more fully illustrated in connection with other figures in the disclosure, also extend the length of the integral unit and serve the same function in this instance, ascribed for them later in the disclosure when applied to an individual single work station.

Fig. 2 is a fragmentary showing of a junction between two individual work stations 1 and 1', further illustrated in Fig. 3, and each similar to work station 1a of Fig. 1 which constitute a portion of an assembly line, and reveals how the combination of channel rail 4 and angle rail 5 of work station 1, and channel rail 4' and angle rail 5' of similar work station 1' forms a continuous track arrangement. Channel rail 4 is in alignment with channel rail 4' of work station 1', while angle rail 5 is in alignment with angle rail 5' of work station 1'. A dolly 44 having wheels 48, 48', 48", and another wheel (not shown) may be manually rolled along the track thus formed to constitute a conveyor down the length of the assembly line of the parts undergoing assembly. Dolly 44 may be selectively secured in place against longitudinal movement by screw 46 mounted on bracket 47 secured to the underside of dolly 44. The screw 46, upon being rotated in the proper direction, makes engagement with the angle rail portion of the track thereby restraining rolling movement of the dolly. A vise 45 is supported by dolly 44, and, in assembly line production, is used to clamp portions of the various units to be assembled. This vise 45 is illustrated by way of example as one possible form of a work fixture but other forms, as dictated by the particular requirements of the apparatus under assembly, may be utilized.

The junction disclosed in Fig. 2, although described in connection with two individual work stations, is also applicable to any combination of single and multiple work station units.

Work board 49 lies across channel rail 4 and angle rail 5 and provides a flat surface which may be used by the operator in performing his work operations. A cleat 50 and a similar cleat (not shown) is secured to work board 49, whereby board 49 may be readily raised and removed from the track so that a dolly 44 may be rolled to the succeeding work station. As will be noted, cleat 50 is not attached to channel rail 5, but merely forms a loose association with it so that board 49 may be angularly guided when raised.

Figs. 1 and 2 reveal some of the essential features and advantages possessed by a work station of this invention. The work station features both a partitioned storage space and a work area. The storage space is enclosed by the slide supports while the work area is bounded by the rails and leg's spreaders.

The rails 4a and 5a not only constitute a boundary for the work area of work station 1a but serve as a portion of a continuous track for dolly 44 whenever individual work stations and multiple work station units are joined together to constitute an assembly line. The simultaneous function performed by rails 4a and 5a adds to the simplicity of the individual or multiple unit work stations and simplifies the combination of such work stations into progressive assembly lines.

The storage space is partitioned by the slide supports and slide rails to support various tote pans and tote baskets so that numerous types of small parts such as sub-assembly units may be stored concurrently. Volume storage for such articles as nuts, bolts, screws, etc., is provided by the trays supported by the revolvable tray support. The storage space is situated both as to height and distance so as to be readily visible and easily accessible to the operator whereby maximum efficiency of his work effort may be effected. The cabinets are also located at a position readily accessible to the operator without interfering with operations performed.

Another important characteristic of work station 1a is that it contains its own individual source of light, thereby making it independent of other lighting equipment. This allows an assembly line composed of these work stations to be varied at will without the necessity of revising the lighting facilities of the plant to accommodate the work station changes. As will be noted later in connection with Fig. 11, it is not necessary to provide each work station with its own individual lamp, although facilities exist on each work station for the installation of a lamp standard and lamp similar to the one shown in Fig. 1.

Fig. 3 is a rear-view of three individual work stations 1, 1', and 1'', joined together in tandem, to form a segment of an assembly line. Mounting angles 71 and 72 form a portion of the unitized framework of the work station 1 and are secured, at their ends, to end legs 2 and 3. These mounting angles 71 and 72 contain a plurality of holes 74 and 75, respectively. Each hole 74 in angle 71 is matched vertically by a corresponding hole 75 in angle 72, thus allowing tray support 32 and slide supports 22, 22', and 22'' to be mounted vertically along the longitudinal length of the work station. The particular details of mounting of these slide supports to the mounting angles through these holes will be more fully described in connection with Fig. 13. A stretcher 73, also a portion of the framework, is integrally connected to end legs 2 and 3 for stabilizing the framework and for serving as a mounting support for foot rest 40 as illustrated in Fig. 10.

Electrical continuity is established through the assembly line by electrically coupling in tandem the conductors enclosed by the conduits of the individual work stations thereof. The conduits and conductors of adjacent work stations are joined at junction boxes located at the intersections between the work stations. Thus, conduit 43 of work station 1 and conduit 42' of work station 1' are interconnected at junction box 44 placed at the mutual point of junction of work stations 1 and 1'. In the same manner, junction box 44' provides a tandem coupling between the electrical conductors within conduit 42 of work station 1 and the conductors within conduit 43' of work station 1'' and is located at the point of junction of work stations 1 and 1''. In this manner a continuous electrical connection may be made between all work stations in an assembly line, and the placement of the work stations in forming the production line need not be made with regard to electrical outlets in the plant. The electric power source may be coupled into the assembly line conduit pattern at any point because of the tandem nature of conduit and conductor connections. Because of this feature, additional flexibility to an assembly line composed of these work stations is provided since the assembly line placement becomes independent of electric power outlets within the plant.

The conduits and junction boxes are supported to the assembly line by the respective outlet boxes which, in turn, are secured to the framework of the assembly line. As illustrated in Fig. 3, outlet box 41 is secured to mounting angle 72 and thereby provides a support for its attached conduits and the associated junction boxes.

The revolvable tray support 32 is rotatably mounted on a mounting support 80 bolted to mounting angles 71 and 72. This mounting support 80, illustrated in Fig. 5, comprises a tube 83 integral with a knee brace 81. Knee brace 81 contains two holes separated by a distance equal to the spacing between the mounting holes 74 on mounting angle 71 and mounting holes 75 on mounting angle 72. This mounting support may be bolted to any of the aligned hole pairs of mounting angles 71 and 72 as illustrated in Fig. 3, thereby allowing the revolvable tray support 32 to be located as desired along the length of the work station.

As illustrated in Figs. 6 and 7, the revolvable tray support 32 comprises a rectangular frame 86 integral with a spindle 90. Spindle 90 comprises a shank 89 of such diameter as to fit into the bore of tube 83 of the mounting support, and a shoulder of slightly greater diameter to rest against the top of tube 83. This relationship between tube 83 and the spindle 90 constitutes a simple yet reliable rotatable mounting for the revolvable tray support. Revolvable tray support 32 also comprises frame pieces 92 and 93 extending vertically, and are secured between the top and bottom portions of rectangular frame 86 to give added strength thereto. Strip elements 94, 95 and 96 extend horizontally in parallel spaced relation on one side of frame 86 and are secured to the vertical portions of the frame and the frame pieces 92 and 93. Corresponding strip elements 97, 98 and 99 are secured horizontally in parallel spaced relation to the other side of frame 86 and vertical frame pieces 92 and 93, and are aligned opposite to elements 94, 95 and 96, respectively, as shown in Fig. 7.

Several trays, of which tray 100 is a typical example, are shown being supported by the tray support 32. This tray 100, preferably made of translucent material, contains a flat back having a curled section 101. This curled section 101 fits snugly over the two strips 94 and 95 in a hook-like fashion, while its flat back portion rests against strip 96. These horizontal strip elements constitute a rigid support for the trays, but allows them to be moved at will as dictated by the assembly operations.

Other groups of horizontal strips extend across the revolvable tray support to constitute mounting supports for additional trays. These additional trays would serve to fill both front and back of the tray support, and consequently, provide considerable volume storage space. Since the tray support is revolvable, the trays on both of its sides are readily available to the operator by rotating the tray support.

Fig. 4 is a cross-sectional view taken along line 4—4 of Fig. 3, and illustrates a typical slide support 22' as mounted to the framework of the work station. Slide support 22' comprises two vertical standards 70' and 77' integrally secured at their lower ends by a knee brace 69', and at their upper ends by a spreader 78'. Knee brace 69' serves as the mounting fixture for the slide support 22', in that it is bolted to the framework of the work station in a manner more fully shown and described in connection with Figs. 8 and 9. Each slide rail consists of a longitudinal member having a right angle cross-section. At one end of the member a stop is formed by an upturned portion of one leg of the angle structure. Two types of slide rails must be provided, one type suitable for being mounted to one side of a slide support, and the other type suitable for being mounted to the other side of a slide support. As illustrated, slide rail 23d of one type is bolted to one side of slide support 22, while slide rails 24f, 24g, and 24h of the other type are bolted to the other side.

These slide rails are bolted to the slide supports at a slight angle with respect to the work area whereby tote pans and baskets resting thereon may come to rest against the stops in a tilted position toward the operator. In this position, the tote pans and baskets are easily accessible to the operator for removal of parts, etc. as required in assembly operations.

The particular construction of end leg 3 forming a portion of the framework of work station 1 is illustrated in Fig. 4 and is characteristic also of the construction of end leg 2. End leg 3 comprises angle standards 65 and 66 secured in a vertical manner at their tops by spreader 68 and at the bottom spacer 67. This box-like construction of the end legs results in a very stable support for the remaining framework.

A work station of this invention may be maintained in an upright position by one of two methods. The work station may be secured to the floor by bolts passing through standards 60, 61 of end legs 2 and standards 65, 66 of end leg 3, or may be maintained vertically by the use of a knee brace bolted to each end leg. Fig. 4 illustrates a knee brace 76 bolted to standard 66 of end leg 3, and this knee brace in conjunction with a similar knee brace bolted to standard 61 of end leg 2 serves to provide a stable support for the work station by overcoming the tipping moment produced by the laterally extending slide supports, the pans and baskets, etc. constituting the storage space.

Fig. 8 is a sectional view taken along line 8—8 of Fig. 4, and Fig. 9 is a sectional view taken along line 9—9 of Fig. 8. These two views illustrate the manner in which the lamp standard 38 is secured to the junction of work stations 1 and 1'. In Fig. 9, the bottom portion of standard 38 is threaded and is secured to the upper portion of junction box 44 by a lock nut and bushing. Lamp standard 38 is also secured above junction box 44 to channel angles 4 and 4' of work stations 1 and 1', respectively, by standard clamp 108, as is shown in Fig. 8. A spacer block 109 is positioned between standard 38 and these two channel angles and serves to maintain standard 38 in a vertical position relative to the framework of both work stations. The electrical conductors within the conduit and lamp standard, not shown for the sake of clarity, would consist of a standard conductor pair in each, and the connections between the conductors within the conduits and the conductors leading to the light source through the lamp standard may be made in any conventional and well-known manner. This continuous electrical conduit line, formed by joining work stations together, may be considered as a representative conduit, by which various utilities, such as air, gas, water, vacuum, etc. could be dispersed to the work stations as required for various assembly operations.

Fig. 13 is a sectional view taken along section lines 13—13 of Fig. 3, and illustrates the manner in which the two adjacent work stations 1, 1" are joined together by mounting the slide supports 22" to their respective frameworks at the point of their junction. A bracket 110" is integral with the knee brace 69" of slide support 22", and is bolted to mounting angles 71 and 71" of work stations 1 and 1", respectively. Another bracket 111", also integral with knee brace 69", is bolted to mounting angles 72 and 72" of work stations 1 and 1", respectively. Slide support 22' is bolted to the framework of adjoining work stations 1 and 1', respectively, in the manner illustrated for the mounting of slide support 22" to adjoining work stations 1 and 1". The dual role played by these brackets in mounting the end slide supports to the assembly line, and joining adjacent work stations together, decreases the number of parts needed to form the assembly line thereby adding to its overall simplicity.

The center slide support 22 is mounted to mounting angles 71 and 72 of work station 1 by brackets 110 and 111 in the manner illustrated in Fig. 3. Here, bracket 110 is bolted to mounting angle 71 and bracket 111 is bolted to mounting angle 72. The middle slide support 22 may be selectively bolted as desired along the length of mounting angles 71 and 72 and can thus be made to accommodate tote pans and baskets of various dimensions. This flexibility is important in incorporating changes in the storage space partitions as may be needed in changing the assembly operations performed at the work station.

Fig. 10 is a cross-sectional view taken along section line 10—10 of Fig. 3 and illustrates the attachment of footrest 40 to stretcher 73. Footrest 40 contains a counterbored hole matched with a corresponding hole in stretcher 73. Footrest 40 is secured to stretcher 73 by a bolt which passes through the two holes with its head resting in the counterbored position of footrest 40. The upper surface of footrest 40 slopes slightly to accommodate the natural angle assumed by the feet of a worker when sitting at the station.

Fig. 11 illustrates schematically how individual work stations and work station units may be connected in tandem to form a portion of an assembly line, and in particular illustrates how various lamps might be arranged to provide lighting for the work operations performed on the assembly line. Each lamp provides light for two adjacent work areas, and its associated standard is secured to the framework of adjacent work stations in the manner illustrated in Fig. 8. The lamp 39-1 provides light for work stations 121-1 and 121-2 and its associated standard is bolted to the assembly line framework therebetween while lamp 39-2 provides light for work stations 121-3, 121-4 and its standard is bolted at the junction of these two work stations. Individual stools are provided for the workers at each work station and, as shown, stools 120-1, 120-2, 120-3, etc., are associated with work stations 121-1, 121-2, 121-3, etc., respectively.

Fig. 12 discloses one possible combination of a plurality of work stations and work station units to form a portion of a complete assembly line. This embodiment is shown to emphasize the particular flexibility of an assembly line constructed of the work stations of this invention. As shown, the production flow begins at the left and loops around an S-shaped portion of the primary production line 125 and is joined at turntable 135 by two sub-assembly lines 126, 127, and subsequently merges into a final production line 128. This S-shaped section of primary production line 125 is made possible through the use of two small L's 130, 131, and two larger L's, 132 and 133. A work station is placed between the small L's 130 and 131 to constitute one loop of the S-shaped assembly line section 125, while the other loop is formed by the junction of two larger L's 132 and 133 without an intermediary work station. These L's consist essentially of two curved tracks of such separation as to interfit with the tracks formed by channel rails 4 and the angle rails 5 of the various work stations. With this arrangement, the dollies on the assembly line, supporting articles of assembly, may have a continuous path along the assembly line. Otherwise, a discontinuity of assembly flow would result from having to bodily transport the dollies from one portion of the assembly line to another portion of the assembly line not in continuous alignment therewith.

The work performed on the first loop of primary assembly section 125 is along its outward edge thereby enclosing a space 140 which is adjacent to the back edges only of the respective work stations. This resultant space 140 is particularly desirable since it may be used for refilling the various tote pans, baskets and revolvable tray containers from the back of the stations without interfering with the workers' performance of their respective assembly operations. Thus, a parts loading truck may be maneuvered into space 140 to effect an efficient reloading operation of the various storage spaces on the respective work stations. The inside edge of the second loop of the primary assembly line 125 contains only workers who will also not be exposed to the reloading operations of their respective work stations since such reloading, in this case, is effected on the outer edge of the second loop.

The tracks of the sub-assembly lines 126 and 127 intersect with the tracks from primary assembly line 125 concurrently at turntable 135, and the final production line 128 extends from this turntable 135. Thus, turntable 135 allows the dollies appearing on the tracks of assembly line 125, 126 and 127 to be rolled, if necessary, onto the tracks of final production line 128 in a continuous manner without any interruption of the lines of flow.

The lines of flow of an assembly line may be rearranged by merely revising the association of the constituent work station units. The steps involved in this revision are extremely simple ones due to the original design of the work station and the means employed in combining the work stations to form the original assembly line combination. First of all, the brackets integral with each slide holder mounted at the points of junction of adjacent work station units must be unbolted from the respective frameworks. Next, the electrical conduits of the adjoining work stations must be unjointed at the junction boxes along with their respective electrical conductors. Lastly, the work stations must be unbolted from the floor if they are secured in this manner as opposed to the floor brace support illustrated in Fig. 4. After these steps have been completed, the work station units may be bodily moved and rearranged and then secured in their new position by following the identical steps in the reverse order and manner.

If the work operations performed at any work station must be altered, changes may be incorporated quite readily into the partitioned storage space in order that different varieties of parts may be stored. If the new operations contemplated essentially involve the assembly of previously fabricated sub-assembly units, to form assembled units, for example, then it is possible that the revolvable tray support need not be utilized and only tote pans and baskets capable of holding the larger sub-assembly units would be needed. Under such a demand, revolvable tray support 32 and its mounting fixture 80 would be removed from the work station and additional slide rails secured to the middle slide support 22 and end slide support 22', and additional tote pans and baskets placed therebetween. The number and size of tote pans and baskets added would be dictated by the number and type of fabricated parts to be utilized in the new assembly operation.

On the other hand, if the new assembly operation involves a change to a more basic type of assembly, as for example, assembly of sub-assembly units, then more volume storage space for component parts such as nuts, bolts, screws, etc., would be necessitated, and such a change might require a second revolvable tray support similar to support 32, but rotatably mounted between slide supports 22 and 22". The mounting support for this second tray support would be bolted to mounting angles 71 and 72 in the manner shown for mounting bracket 80 associated with revolvable tray support 32.

The middle slide support 22 in any instance may be mounted longitudinally as desired along the angle supports to thereby divide the storage space into two main partitions. Its precise location at any work station is determined by the width of the revolvable tray support or by the width of the tote pans or baskets. This flexible mounting of the middle slide support allows various sized tote pans and baskets to be utilized and hence does not limit the tote pans and baskets to any predetermined or perhaps non-standard size. Thus, commercial sizes of tote pans and baskets may be employed thereby serving to simplify the work station as well as to reduce its overall expense.

If an individual work station unit is to be utilized by itself without being added to similar work stations to form an assembly line, then provision must be made for securing its end slide supports to its unitized framework. As illustrated in Fig. 1, this may be accomplished for end slide support 22a" by bolting one side of an angle 140 to standard 61a of leg 2a, and bolting the other side of angle 140 to the legs of the brackets integrally with slide support 22" which normally would be used to secure this work station unit to an adjacent work station unit. Another slide support 22 (not shown) may be similarly secured to leg 3a at the other end of the work station unit by an angle piece similar to angle 140.

An individual work station unit might be utilized by itself as an individual assembly station for sub-assembly or fabrication parts, and as such, would possess all the advantages possessed by a similar work station in an assembly line with respect to the efficiency of work made possible by the convenience of the work area and storage space to the operator. Also, the individual station would possess its own light source, and its storage space could be readily manipulated to accommodate different types of sub-assembly operations. When used by itself, the tracks of the work station have no particular utility other than providing an extremely rigid and stable support between its respective end legs. Also, the tracks would be useful in providing a frame-like housing around the work area, and as such, would have utility in preventing small parts from falling onto the floor of the plant.

What is claimed as new is:

1. A unitary work station, having parallel tracks for movably mounting a work holder for work to be progressively assembled and adjustable storage facilities for accommodating containers for component parts, usable in multiples for arranging a production line that can be readily rearranged, said unitary work station comprising: a framework having front and back legs, an angle rail fixed to the upper ends of said front legs, a channel rail fixed to the upper ends of said back legs, and spreaders separating said front and back legs, whereby said rails are maintained a fixed distance apart to form the parallel tracks of said work station, said framework having ends so constructed as to permit end to end connections between a series thereof, whereby the parallel tracks of each work station form a continuation of the parallel tracks of an adjoining work station when a series of said work stations is arranged to form a production line; and means for removably supporting tote pans and baskets upwardly and rearwardly of said tracks to permit access to said pans and baskets from in front of the work station, and to permit easy loading and unloading of said pans and baskets from the back of said work station without interfering with work being assembled on said tracks, said means including selectively positioned slide supports attached to said framework, and selectively positioned slide members attached to said slide supports for accommodating said tote pans and baskets.

2. The unitary work station defined in claim 1 in which said framework further includes a pair of longitudinal members extending between the upper end portions of the back legs thereof, each member of said pair of members having a series of spaced holes for selectively positioning the attachment of said slide supports to said framework; and in which each of said slide supports includes a pair of brackets to effect the attachment thereof to said pair of longitudinal members, said pair of brackets also being operable as means for maintaining the end-to-end connection between adjoining frameworks when a series of said frameworks is arranged to form a production line.

3. The unitary work station defined in claim 1 which further includes revolvable means for removably supporting small-parts trays upwardly and rearwardly of said tracks, said revolvable means including a rectangular frame having transverse members arranged to accommodate said trays on opposite sides of said rectangular frame, and a selectively positioned knee brace attached to said framework vertically and pivotally supporting said rectangular frame to permit rotation thereof for easy access to said trays on both sides of said rectangular frame from in front of said work station, said rectangular frame being accessible from the back of said work station to permit easy loading and unloading of said small-parts trays without interfering with work being assembled on said tracks.

4. A unitary work station defined in claim 1 which also includes means for illuminating the track and storage facilities of said work station, said means including a lighting fixture overhanging said work station, and a standard attached to said framework for supporting said lighting fixture, whereby a production line formed by a plurality of said work stations is illuminated independent of other lighting facilities.

5. In a production line having parallel tracks for movably mounting a holder for work to be progressively assembled, and having adjustable storage facilities for component parts of the work, a plurality of work stations connected end to end, each of said unitary work stations comprising: a framework having front and back legs, an angle rail fixed to the upper ends of said front legs, a channel rail fixed to the upper ends of said back legs, and spreaders separating said front and back legs, whereby said rails are maintained a fixed distance apart to form parallel tracks, said framework having ends to constructed as to permit end-to-end connection between a series thereof, whereby the parallel tracks of each work station forms a continuation of the parallel tracks of an adjoining work station; and means for removably supporting tote pans and baskets upwardly and rearwardly of said tracks to permit access to said pans and baskets from in front of the production line, and to permit easy loading and unloading of said pans and baskets from the back of said production line without interfering with work being assembled on said tracks, said means including selectively positioned slide supports attached to said framework and, selectively positioned slide members attached to said slide supports for accommodating said tote pans and baskets.

6. The combination defined in claim 5 in which at least one of said unitary work stations also includes revolvable means for removably supporting small-parts trays upwardly and rearwardly of said tracks, said revolvable means including a rectangular frame having transverse members arranged to accommodate said trays on opposite sides of said rectangular frame, and a selectively positioned knee brace attached to said framework vertically and pivotally supporting said rectangular frame to permit rotation thereof for easy access to said trays on both sides of said rectangular frame from in front of the production line, said rectangular frame being accessible from the back of said production line to permit easy loading and unloading of said small-parts trays without interfering with work being assembled on said tracks.

References Cited in the file of this patent

UNITED STATES PATENTS

| Number | Name | Date |
| --- | --- | --- |
| 1,750,060 | Smiley | Mar. 11, 1930 |
| 1,997,742 | Predovich | Apr. 16, 1935 |
| 2,045,756 | Cone | June 30, 1936 |
| 2,322,748 | Shaw | June 29, 1943 |
| 2,421,716 | Rose | June 3, 1947 |
| 2,495,964 | Gustaveson | Jan. 3, 1950 |